United States Patent
Kudo

(10) Patent No.: US 7,925,415 B2
(45) Date of Patent: Apr. 12, 2011

(54) VEHICLE DRIVE ASSIST SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/289,033

(22) Filed: Oct. 17, 2008

(65) Prior Publication Data
US 2009/0125204 A1 May 14, 2009

(30) Foreign Application Priority Data
Oct. 18, 2007 (JP) ................................. 2007-271612

(51) Int. Cl.
*B60T 7/12* (2006.01)
(52) U.S. Cl. .............. 701/96; 701/26; 701/93; 180/167; 318/587; 348/119
(58) Field of Classification Search .............. 701/25–26, 701/28, 93, 96–97; 180/167; 318/587; 348/119
See application file for complete search history.

(56) References Cited

U.S. PATENT DOCUMENTS

| | | | | |
|---|---|---|---|---|
| 4,632,543 A | * | 12/1986 | Endo | 356/5.08 |
| 5,229,941 A | * | 7/1993 | Hattori | 701/26 |
| 5,369,591 A | * | 11/1994 | Broxmeyer | 701/301 |
| 5,684,697 A | * | 11/1997 | Mullen | 701/28 |
| 5,815,825 A | * | 9/1998 | Tachibana et al. | 701/23 |
| 5,938,707 A | * | 8/1999 | Uehara | 701/41 |
| 6,092,619 A | * | 7/2000 | Nishikawa et al. | 180/446 |
| 6,151,539 A | * | 11/2000 | Bergholz et al. | 701/25 |
| 6,285,393 B1 | * | 9/2001 | Shimoura et al. | 348/119 |
| 6,343,247 B2 | * | 1/2002 | Jitsukata et al. | 701/28 |
| 6,473,678 B1 | * | 10/2002 | Satoh et al. | 701/41 |
| 6,493,619 B2 | * | 12/2002 | Kawazoe et al. | 701/41 |
| 6,542,800 B2 | * | 4/2003 | Kawazoe et al. | 701/41 |

(Continued)

FOREIGN PATENT DOCUMENTS

DE 3912353 A * 11/1989

(Continued)

OTHER PUBLICATIONS

A Guidance System for a Vehicle Which Has to Follow a Memorized Path, M. Julliere, L. Marce and H. Perrichot, L.A.T.E.A., Institut National des Sciences Appliquees, pp. 211-221, cited by others.*

(Continued)

*Primary Examiner* — Cuong H Nguyen
(74) *Attorney, Agent, or Firm* — McGinn IP Law Group, PLLC

(57) ABSTRACT

In automatic steering control, when both a traveling lane and a preceding vehicle are detected, a target position on a first vehicle traveling path based on traveling lane information and a target position on a second vehicle traveling path based on preceding vehicle information are set as a first target position and a second target position, respectively. When the second target position is set farther than the first target position, the correction amount of the distance between the first target position and the second vehicle traveling path is set in accordance with the distance difference in the front-rear direction between the first and second target positions, and a third target position is set by correcting the first target position by the correction amount so as to become closer to the second vehicle traveling path. The steering control amount is calculated on the basis of the third target position.

5 Claims, 6 Drawing Sheets

U.S. PATENT DOCUMENTS

| | | | |
|---|---|---|---|
| 6,580,986 B1 * | 6/2003 | Uenuma et al. | 701/41 |
| 6,738,705 B2 * | 5/2004 | Kojima et al. | 701/96 |
| 6,778,890 B2 * | 8/2004 | Shimakage et al. | 701/41 |
| 7,162,333 B2 * | 1/2007 | Koibuchi et al. | 701/1 |
| 7,216,023 B2 * | 5/2007 | Akita | 701/41 |
| 7,433,772 B2 * | 10/2008 | Isaji et al. | 701/71 |
| 7,634,339 B2 * | 12/2009 | Kudo | 701/41 |
| 2002/0013647 A1 * | 1/2002 | Kawazoe et al. | 701/41 |
| 2002/0169531 A1 * | 11/2002 | Kawazoe et al. | 701/41 |
| 2005/0027402 A1 * | 2/2005 | Koibuchi et al. | 701/1 |
| 2006/0030987 A1 * | 2/2006 | Akita | 701/41 |
| 2006/0235598 A1 * | 10/2006 | Kudo | 701/96 |
| 2007/0191997 A1 * | 8/2007 | Isaji et al. | 701/1 |
| 2007/0276577 A1 * | 11/2007 | Kuge et al. | 701/96 |
| 2009/0125204 A1 * | 5/2009 | Kudo | 701/96 |
| 2009/0194350 A1 * | 8/2009 | Rattapon et al. | 180/169 |
| 2009/0216405 A1 * | 8/2009 | Kudo | 701/41 |
| 2010/0280713 A1 * | 11/2010 | Stahlin et al. | 701/41 |

FOREIGN PATENT DOCUMENTS

| | | | |
|---|---|---|---|
| EP | 1170651 A2 * | 1/2002 | |
| JP | 8-114875 * | 5/1996 | |
| JP | 09221053 A * | 8/1997 | |
| JP | 11-219171 * | 2/1999 | |
| JP | 2000-205488 * | 7/2000 | |
| JP | 2000-268218 * | 9/2000 | |
| JP | 2001039325 A * | 2/2001 | |
| JP | 2001039326 A * | 2/2001 | |
| JP | 2001-274523 * | 3/2003 | |
| JP | 2003-081123 | 3/2003 | |
| JP | 2008-046192 * | 2/2008 | |
| JP | 2008044561 A * | 2/2008 | |
| JP | 2008162492 A * | 7/2008 | |
| JP | 2009202708 A * | 9/2009 | |
| WO | PCT/EP2008/067360 * | 12/2008 | |

OTHER PUBLICATIONS

An Experimental System for Automatic Guidance of Roboted Vehicle Following the Route Stored in Memory, T. Tsumura, N. Fujiwara, T. Shirakawa and M. Hashimoto, pp. 187-194, cited by others.*

Model-Based Lane Detection and Lane Following for Intelligent Vehicles; Jianzhuang Wang; Youping Chen; Jingming Xie; Haiping Lin; Intelligent Human-Machine Systems and Cybernetics (IHMSC), 2010 2nd International Conference on; vol. 2 Digital Object Identifier: 10.1109/IHMSC.2010.143; Publication Year: 2010 , pp. 170-175.*

Soft-Computing-Based Embedded Design of an Intelligent Wall/Lane-Following Vehicle; Tsui, W.; Masmoudi, M.S.; Karray, F.; Insop Song; Masmoudi, M.; Mechatronics, IEEE/ASME Transactions on; vol. 13 , Issue: 1; Digital Object Identifier: 10.1109/TMECH.2007.910054; Publication Year: 2008 , pp. 125-135.*

Intelligent Vehicles Oriented Lane Detection Approach under Bad Road Scene; Huan Shen; Shunming Li; Fangchao Bo; Xiaodong Miao; Fangpei Li; Wenyu Lu; Computer and Information Technology, 2009. CIT '09. Ninth IEEE International Conference on; vol. 1; Digital Object Identifier: 10.1109/CIT.2009.25; Publication Year: 2009 , pp. 177-182.*

On optimal design of a lane change controller; Hatipoglu, C.; Ozguner, U.; Unyelioglu, K.A.; Intelligent Vehicles '95 Symposium., Proceedings of the; Digital Object Identifier: 10.1109/IVS.1995.528321; Publication Year: 1995 , pp. 436-441.*

Low cost driver monitoring and warning system development; Cayir, B.; Acarman, T.; Intelligent Vehicles Symposium, 2009 IEEE; Digital Object Identifier: 10.1109/IVS.2009.5164259 ; Publication Year: 2009 , pp. 94-98.*

Developing autonomous maneuvering capabilities for future cars; Laugier, C.; Paromtchik, I.; Parent, M.; Intelligent Transportation Systems, 1999. Proceedings. 1999 IEEE/IEEJ/JSAI International Conference on; Digital Object Identifier: 10.1109/ITSC.1999.821029; Publication Year: 1999 , pp. 68-73.*

A nested PID steering control for lane keeping in vision based autonomous vehicles; Marino, R.; Scalzi, S.; Orlando, G.; Netto, M.; American Control Conference, 2009. ACC '09.; Digital Object Identifier: 10.1109/ACC.2009.5160343; Publication Year: 2009, pp. 2885-2890.*

A model-based object following system; Muller, A.; Manz, M.; Himmelsbach, M.; Wunsche, H.J.; Intelligent Vehicles Symposium, 2009 IEEE; Digital Object Identifier: 10.1109/IVS.2009.5164285; Publication Year: 2009, pp. 242-249.*

Lateral motion control of four-wheels steering vehicle using a sliding-mode controller; Solea, R.; Filipescu, A.; Cernega, D.; Control Conference (CCC), 2010 29th Chinese; Publication Year: 2010, pp. 3699-3703.*

Nonlinear vehicle dynamics control for EV with 4 in-wheel motors; Xiong, Lu; Yu, Zhuoping; Meng, Yufeng; Vehicular Electronics and Safety (ICVES), 2010 IEEE International Conference on; Digital Object Identifier: 10.1109/ICVES.2010.5550954 Publication Year: 2010, pp. 18-23.*

Design and stability analysis of a lane following controller; Unyelioglu, K.A.; Hatipoglu, C.; Ozguner, U.; Control Systems Technology, IEEE Transactions on; vol. 5, Issue: 1; Digital Object Identifier: 10.1109/87.553671 Publication Year: 1996, pp. 127-134.*

Lane tracking control in vehicle-following collision situations; Chan, C.-Y.; Tan, H.-S.; American Control Conference, 1999. Proceedings of the 1999; vol. 5; Digital Object Identifier: 10.1109/ACC.1999.782456; Publication Year: 1999, pp. 3697-3701 vol. 5.*

A constrained wheel torque controller for lane following system using control distribution; Ling-Yuan Hsu; Weng, K.; Tsung-Lin Chen; American Control Conference (ACC), 2010; Publication Year: 2010, pp. 997-1002.*

Design of an Adaptive Cruise Control/Collision Avoidance with lane change support for vehicle autonomous driving; Dongwook Kim; Seungwuk Moon; Jaemann Park; Kim, H.J.; Kyongsu Yi; ICCAS-SICE, 2009; Publication Year: 2009, pp. 2938-2943.*

* cited by examiner

VEHICLE DRIVE ASSIST SYSTEM

CROSS-REFERENCE TO RELATED APPLICATIONS

The disclosure of Japanese Patent Application No. 2007-271612 filed on Oct. 18, 2007 including the specification, drawings and abstract is incorporated herein by reference in it entirety.

BACKGROUND OF THE INVENTION

1. Field of the Invention

The present invention relates to a vehicle drive assist system that assists driving by assisting steering with reference to a traveling lane and a preceding vehicle.

2. Description of the Related Art

In recent years, drive assist systems have been developed and used practically. In drive assist systems, a traveling environment in front of a vehicle is detected, for example, by a camera mounted in the vehicle. On the basis of data on the traveling environment, a traveling lane and a preceding vehicle are detected, and driving is controlled along the traveling lane or while following the preceding vehicle.

For example, Japanese Unexamined Patent Application Publication No. 2003-81123 discloses a vehicle steering control system in which a traveling lane is detected and a vehicle is caused to run along the traveling lane. In this system, a target yaw rate is calculated from the lateral displacement of a forward gazing point, the vehicle speed, and the forward-gazing-point distance, and a steering torque is generated so that the calculated target yaw rate can be obtained.

However, in the steering control system disclosed in the above publication, control is performed so as to obtain the target yaw rate calculated from the lateral displacement of the forward gazing point, the vehicle speed, and the forward-gazing-point distance. Therefore, control is constrained by the balance among these parameters, and this may hinder natural control. For example, while it is sometimes natural that running is performed along the traveling lane, it is sometimes natural that running is performed while following the preceding vehicle. Further, when both the traveling lane and the preceding vehicle are recognized, it is important to determine the balance therebetween.

SUMMARY OF THE INVENTION

The present invention has been made in view of the above-described circumstances, and an object of the invention is to provide a vehicle drive assist system that can perform natural control with proper consideration for the relationship between a traveling lane and a preceding vehicle in a traveling environment and that can stably perform steering assist control without giving any discomfort and anxiety to the driver.

A vehicle drive assist system according to an aspect of the present invention includes traveling-lane information detecting unit for detecting information about a forward traveling lane; preceding-vehicle information detecting unit for detecting information about a preceding vehicle; first-target-position setting unit for setting a target position on a first vehicle traveling path based on the information about the forward traveling lane as a first target position; second-target-position setting unit for setting a target position on a second vehicle traveling path based on the information about the preceding vehicle as a second target position; third-target-position setting unit for setting a correction amount in accordance with a distance difference in the front-rear direction between the second target position and the first target position when the second target position is set farther than the first target position, and for setting a third target position by performing correction by the correction amount so that the first target position becomes closer to the second vehicle traveling path; and steering-control-amount calculation unit for calculating a steering control amount on the basis of the third target position.

According to the vehicle drive assist system of the present invention, it is possible to perform natural control with proper consideration for the relationship between the traveling lane and the preceding vehicle in the traveling environment and to stably perform steering assist control without giving any discomfort and anxiety to the driver.

DESCRIPTION OF THE PREFERRED EMBODIMENTS

An embodiment of the present invention will be described below with reference to the drawings.

Figure 1:
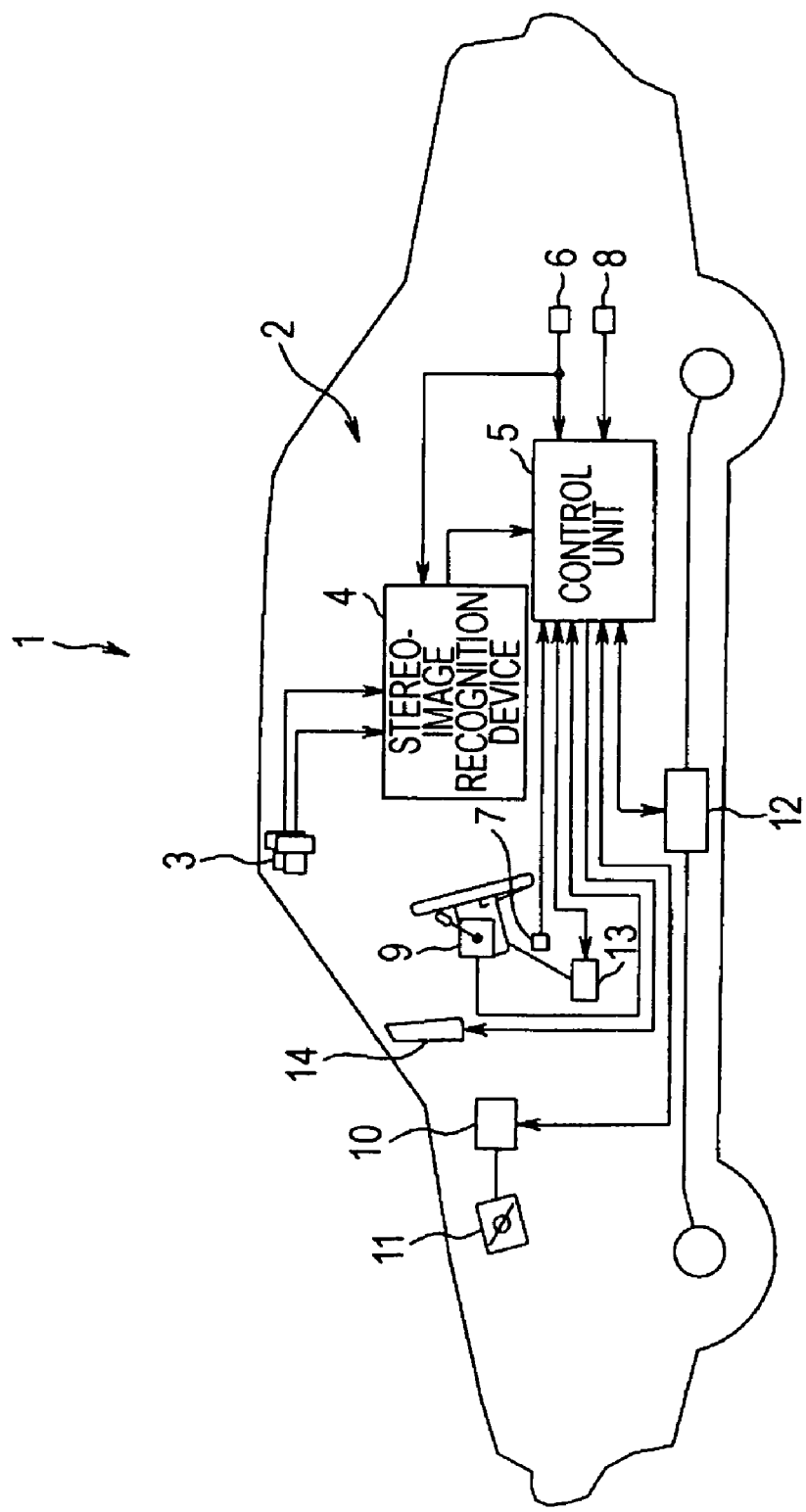
FIG. 1 is a schematic structural view of a drive assist system mounted in a vehicle.

Referring to FIG. 1, an adaptive cruise control (ACC) system 2 serving as a drive assist system according to an embodiment is mounted in a vehicle 1 such as a car.

The ACC system 2 mainly includes a stereo camera 3, a stereo-image recognition device 4, and a control unit 5. Basically, the ACC system 2 performs constant-speed running control (constant-speed acceleration and deceleration control and automatic steering control) along a traveling lane while maintaining a vehicle speed set by the driver when there is no preceding vehicle, and performs automatic follow-up control (follow-up acceleration and deceleration control and automatic steering control) on the basis of the relationship between the traveling lane and a preceding vehicle when there is a preceding vehicle.

The vehicle 1 also includes a vehicle-speed sensor 6 for detecting a vehicle speed $V_0$, a steering-wheel-angle sensor 7 for detecting a steering wheel angle $\theta_H$, and a yaw-rate sensor 8 for detecting a yaw rate $\gamma r$. A vehicle speed $V_0$ is input to the stereo-image recognition device 4 and the control unit 5, and a steering wheel angle $\theta_H$ and a yaw rate $\gamma r$ are input to the control unit 5. Further, an ON/OFF signal for a brake pedal is input from a brake switch (not shown) to the control unit 5.

Signals from a plurality of switches that constitute a constant-speed running switch 9 are input to the control unit 5. The constant-speed running switch 9 is connected to a constant-speed running control lever provided at a side of a steering column. The constant-speed running switch 9 includes a vehicle-speed setting switch for setting a target vehicle speed during constant-speed running, a coast switch for mainly changing the target vehicle speed to a lower speed, and a resume switch for mainly changing the target vehicle speed to a higher speed. Near the constant-speed running control lever, a main switch (not shown) for turning on and off the entire drive assist system is provided.

The stereo camera 3 includes a pair of (right and left) CCD cameras each using a solid-state image pickup element, such as a charge coupled device (CCD), as a stereo optical system. The right and left CCD cameras are mounted on the front of a ceiling in the vehicle interior in a manner such as to be arranged with a predetermined space therebetween. The CCD cameras take stereo images of outside objects from different viewpoints, and input data on the images to the stereo-image recognition device 4.

Figure 5:
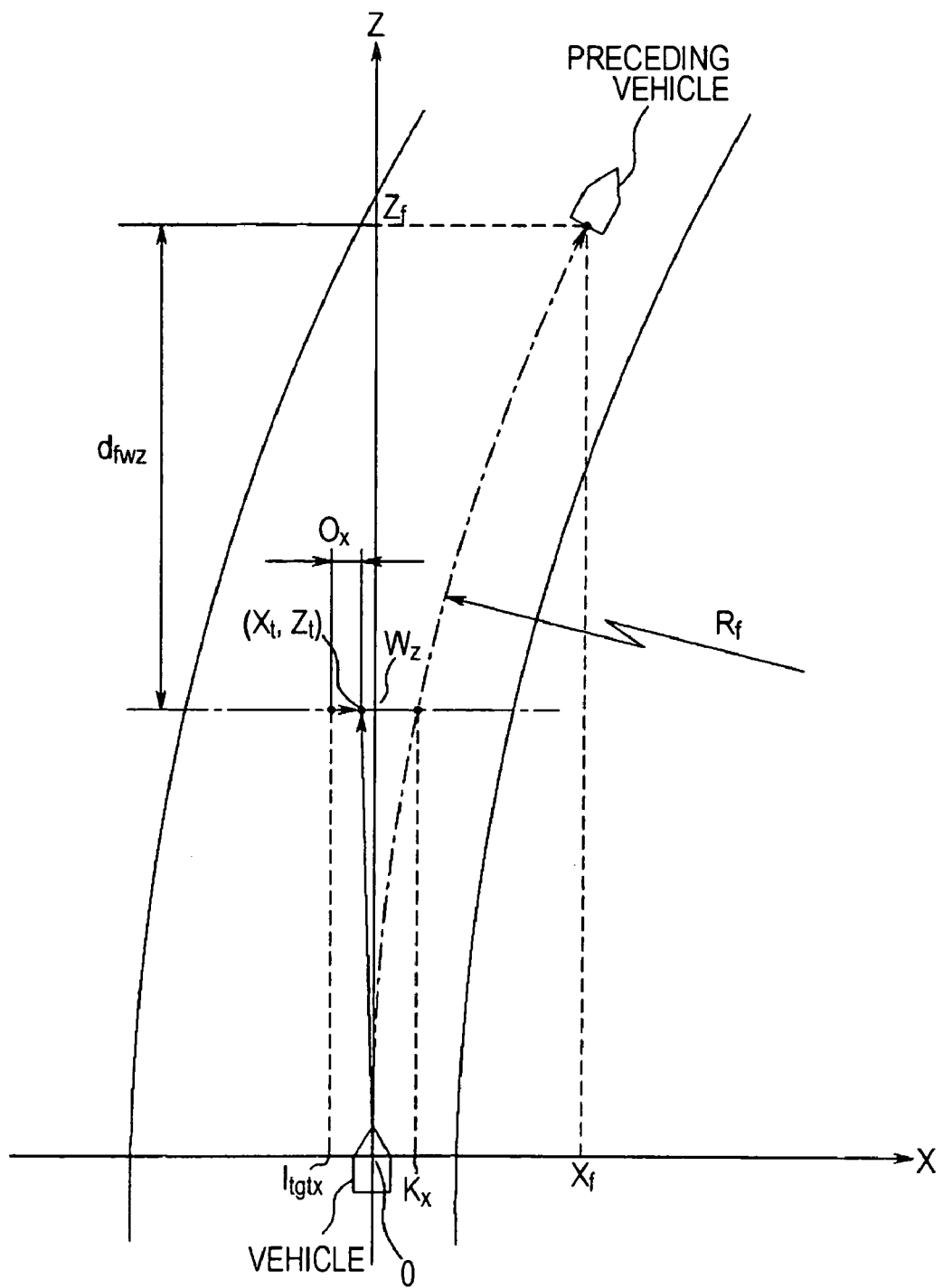
FIG. 5 is an explanatory view showing the coordinates of a traveling lane and a preceding vehicle with their origin at a position of the vehicle, and the positional relationship thereamong.

The stereo-image recognition device 4 receives image data from the stereo camera 3 and the vehicle speed $V_0$ from the vehicle-speed sensor 6. On the basis of the image data from the stereo camera 3, the stereo-image recognition device 4 detects forward information, that is, data on three-dimensional objects and white lines in front of the vehicle 1, and estimates a traveling lane of the vehicle 1. Then, the stereo-image recognition device 4 extracts a preceding vehicle in front of the vehicle 1, and outputs, to the control unit 5, data on a preceding vehicle position (for example, a coordinate position on the X(lateral direction)-Y(front-rear direction) coordinate system with the origin at the vehicle 1, as shown in FIG. 5), a preceding vehicle distance (intervehicle distance), a preceding vehicle speed ((amount of change in intervehicle distance)÷(vehicle speed)), a preceding vehicle acceleration (a differential value of the preceding vehicle speed), positions of stationary objects other than the preceding vehicle, white line coordinates, recognized white line distances, and vehicle traveling path coordinates.

For example, image data from the stereo camera 3 is processed in the stereo-image recognition device 4 in the following manner. First, distance information is found from the amount of misalignment between the corresponding positions in a pair of stereo images taken in the traveling direction of the vehicle 1 by the stereo camera 3 according to the principle of triangulation, and a distance image indicating a three-dimensional distance distribution is generated. This image data is subjected to known grouping, and is compared with prestored three-dimensional road shape data and three-dimensional object data. As a result of comparison, white line data, side wall data on guardrails and curbs extending along the road, and three-dimensional data on vehicles and the like are extracted.

As three-dimensional object data, the distance to a three-dimensional object and the amount of temporal change in the distance (speed relative to the vehicle 1) are found. In particular, a vehicle that is closest to the vehicle 1 on the traveling lane of the vehicle 1 and that runs at a predetermined speed (for example, 0 km/h or more) in almost the same direction as the direction of the vehicle 1 is extracted as a preceding vehicle. A preceding vehicle whose speed is substantially 0 km/h is recognized as a stopped preceding vehicle. As three-dimensional object information and preceding-vehicle information, position information about the right and left end points of the rear surface of the preceding vehicle is stored, and about the midpoint between the right and left end points of the rear surface is stored as a position (xf, zf) of the center of gravity of the three-dimensional object or the preceding vehicle. In this way, the stereo camera 3 and the stereo-image recognition device 4 are provided as traveling lane information detecting unit and preceding-vehicle information detecting unit.

The control unit 5 achieves a constant-speed acceleration and deceleration control function of performing constant-speed running control so as to maintain a target vehicle speed entered by the user, a follow-up acceleration and deceleration control function of performing acceleration and deceleration to follow the preceding vehicle, and an automatic steering control function of performing automatic steering along the traveling lane or in accordance with the relationship between the traveling lane and the preceding vehicle.

As the constant-speed acceleration and deceleration control function for constant-speed running control, when the driver turns on the main switch (not shown) and sets a desired vehicle speed by the constant-speed running control lever, a signal is input from the constant-speed running switch 9 to the control unit 5. In order to converge the vehicle speed detected by the vehicle-speed sensor 6 to the vehicle speed set by the driver, a signal is output to a throttle-valve control device 10, and the opening of a throttle valve 11 is subjected to feedback control so that the vehicle 1 automatically runs at a constant speed. Alternatively, a deceleration signal is output to an automatic brake control device 12 so as to start automatic braking-When a preceding vehicle is recognized by the stereo-image recognition device 4 during constant-speed running control, the control unit 5 automatically switches the constant-speed running control to automatic follow-up control. The constant-speed running control function and the automatic follow-up control function are released when the driver depresses the brake pedal, when the speed of the vehicle 1 exceeds a preset upper limit value, or when the main switch is turned off.

When running control of the vehicle shifts to follow-up running control, for example, a target intervehicle time is calculated and set on the basis of the speed of the vehicle 1, and a target acceleration is calculated on the basis of the intervehicle distance to the preceding vehicle, the speed of the preceding vehicle, the speed of the vehicle 1, and the target intervehicle time, and is output as a signal to the throttle-valve control device 10 so as to subject the opening of the throttle valve 11 to feedback control. Alternatively, a deceleration signal is output to the automatic brake control device 12 so as to perform automatic braking and follow-up running (including follow-up stop and follow-up start) (follow-up acceleration and deceleration control).

Figure 2:
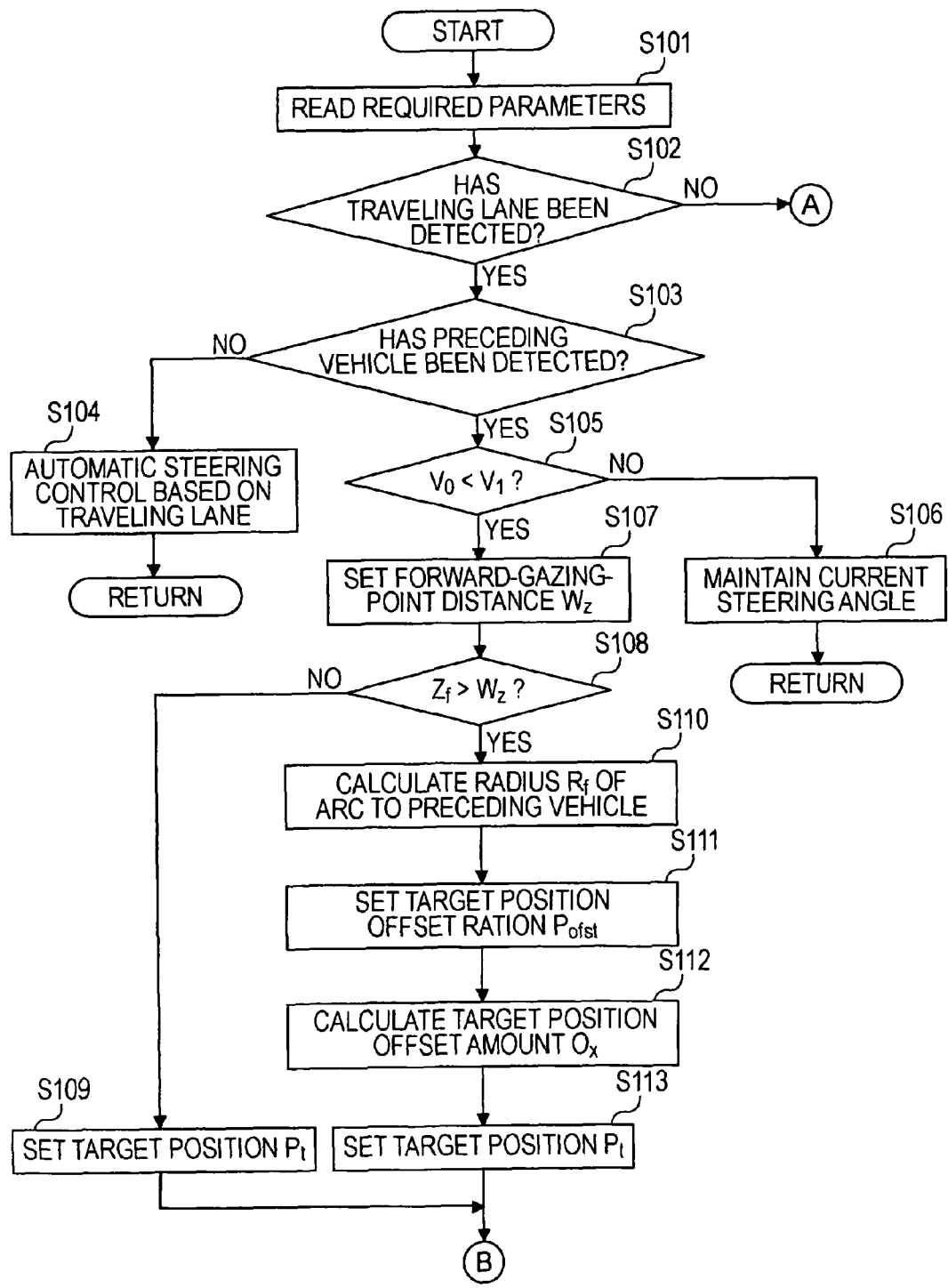
FIG. 2 is a flowchart showing an automatic steering control program performed in drive assist control.
Figure 3:
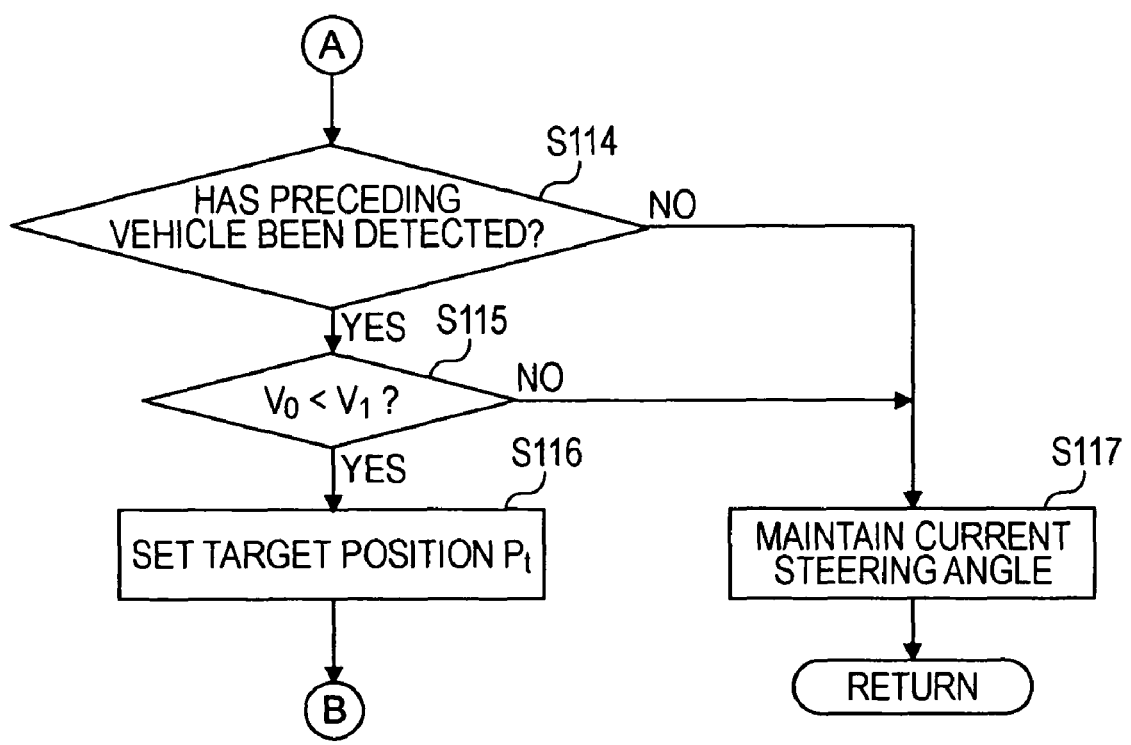
FIG. 3 is a flowchart as a continuation of the flowchart shown in FIG. 2.
Figure 4:
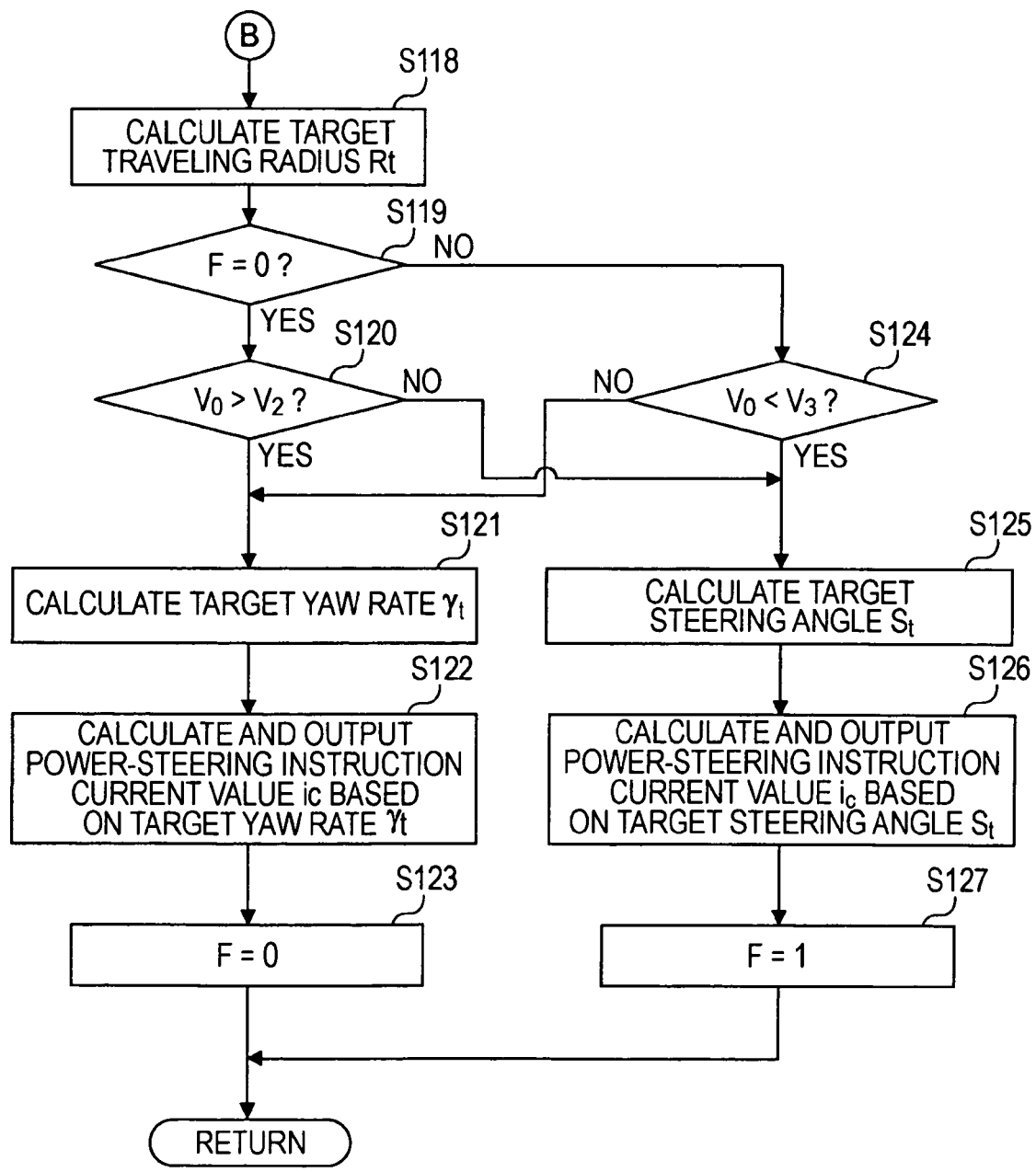
FIG. 4 is a flowchart as a continuation of the flowchart shown in FIG. 2.

In constant-speed running control and follow-up running control, when automatic steering control is performed along the traveling lane or in accordance with the relationship between the traveling lane and the preceding vehicle, a power-steering instruction current value $i_c$ for an electrical power-steering control device 13 is calculated and output as a steering control amount so as to carry out automatic steering control, according to the following flowcharts shown in FIGS. 2 to 4.

This automatic steering control is executed in a region where the vehicle speed $V_0$ is less than $V_1$ (for example, 35 km/h). When the traveling lane is not detected and the preceding vehicle is detected, steering is controlled by using the position of the center of gravity of the preceding vehicle as a target position. When none of the traveling lane and the preceding vehicle are detected, control is performed so as to maintain the current steering wheel angle.

When the traveling lane is detected and the preceding vehicle is not detected, steering control is performed along the traveling lane. When both the traveling lane and the preceding vehicle are detected, a target position on a first vehicle traveling path based on the traveling lane information is set as a first target position, and a target position on a second vehicle traveling path based on the preceding-vehicle information is set as a second target position. When the second target position is set farther than the first target position, the amount of correction of the distance between the first target position and the second vehicle traveling path is set in accordance with the distance difference in the front-rear direction between the second target position and the first target position, and a third target position is set by correcting the first target position by the correction amount so as to become closer to the second vehicle traveling path. The amount of steering control is calculated on the basis of the third target position. In this way, the control unit 5 functions as first-target-position setting unit, second-target-position setting unit, third-target-position setting unit, and steering-control-amount calculation unit.

Referring to FIG. 1, a liquid crystal monitor 14 displays operation states of the ACC system 2. For example, the liquid crystal monitor 14 is used together with a navigation system mounted in the vehicle 1.

An automatic steering control program executed in drive assist control will now be described with reference FIGS. 2 to 4 serving as flowcharts.

This automatic steering control program is executed at regular intervals after the main switch of the ACC system 2 is turned on. First, required parameters are read in Step (hereinafter abbreviated as "S") 101.

In S102, it is determined whether a traveling lane has been detected. When it is determined that the traveling lane has been detected, it is determined in S103 whether a preceding vehicle has been detected. When it is determined that the preceding vehicle has not been detected, that is, that the traveling lane has been detected, but the preceding vehicle has not been detected, automatic steering control based on the traveling lane is performed in S104. Then, the program is escaped.

In automatic steering control based on the traveling lane, for example, a vehicle traveling path is formed parallel to the traveling lane, and a power-steering instruction current value $i_c$ for the electrical power-steering control device 13 is set so that steering is performed along the vehicle traveling path.

More specifically, as shown in FIG. 5, a forward gazing point distance $W_z$, which will be described-below, is set ahead in the traveling lane, and almost the center (forward gazing point) of the traveling lane at the forward gazing point distance $W_z$ is set as a target position Pt(xt,zt). A path to the target position Pt(xt,zt) is set as a vehicle traveling path (for example, approximated by an arc). Then, a steering angle necessary for running along the vehicle traveling path is calculated, and a power-steering instruction current value $i_c$ serving as the amount of steering control is set so that the calculated steering angle is obtained.

Figure 6:
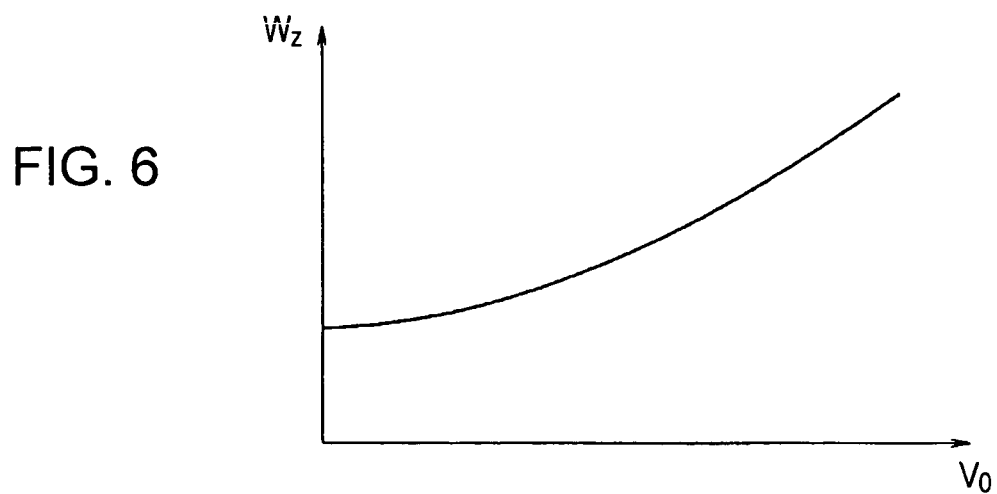
FIG. 6 is an explanatory view showing an example of a characteristic of a forward-gazing-point distance.

The forward gazing point distance $W_z$ is set beforehand in accordance with the vehicle speed $V_0$, for example, by a map shown in FIG. 6. The forward gazing point distance $W_z$ is set to shift forward as the vehicle speed $V_0$ increases.

When it is determined in S103 that the preceding vehicle has been detected, that is, that both the traveling lane and the preceding vehicle have been detected, in S105, the vehicle speed $V_0$ is compared with a preset threshold value $V_1$ (for example, 35 km/h) of the vehicle speed. When it is determined that the vehicle speed $V_0$ is more than or equal to the threshold value $V_1$, the current steering angle is maintained in S106. Then, the program is escaped.

When the vehicle speed $V_0$ is less than the threshold value $V_1$ ($V_0 < V_1$), S107 to S113 are performed. When $V_0 < V_1$, a forward gazing point distance $W_z$ is set in S107, for example, by the map shown in FIG. 6, and the coordinate $Z_f$ of the center of gravity of the preceding vehicle is compared with the forward gazing point distance $W_z$ in S108.

As a result of comparison in S108, when the coordinate $Z_f$ of the center of gravity of the preceding vehicle is less than or equal to the forward gazing point distance $W_z$ ($Z_f \leq W_z$), the coordinates of the center of gravity of the preceding vehicle, that is, (xf,zf) is set as a target position Pt(xt,zt) in S109. Then, the program proceeds to S118.

In contrast, when the coordinate $Z_f$ of the center of gravity of the preceding vehicle is farther than the forward gazing point distance $W_z$ ($Z_f > W_z$), in S110, the point (xf,zf) of the center of gravity of the preceding vehicle, that is, a vehicle traveling path (second vehicle traveling path) to a second target position is approximated by an arc. For example, the radius $R_f$ of the arc is calculated according to the following Expression (1):

$$R_f = (x_f^2 + z_f^2)/(2 \cdot x_f) \tag{1}$$

Figure 7A:
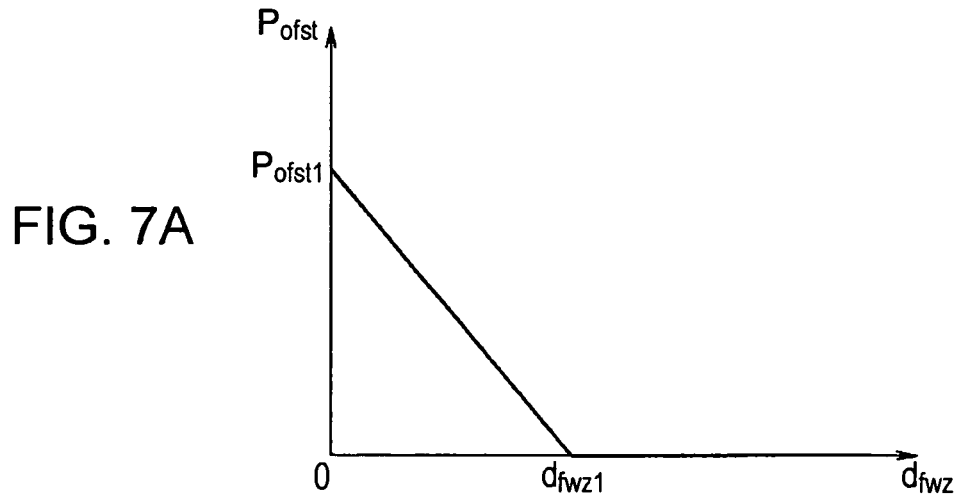
FIGS. 7A and 7B are explanatory views showing a target-position offset ratio set with reference to a distance difference in the front-rear direction between the preceding vehicle and the forward-gazing-point distance.
Figure 7B:
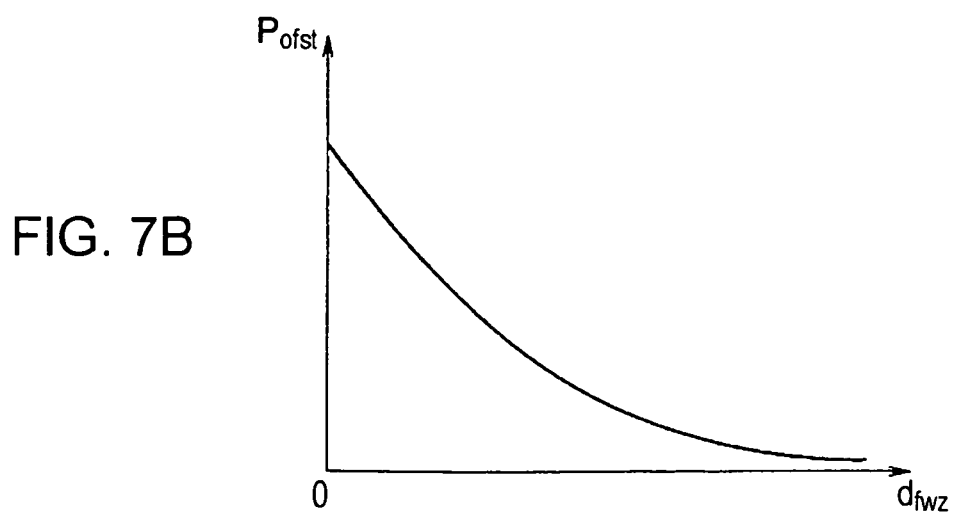

In S111, a target position offset ratio $P_{ofst}$ is set with reference to a map, for example, shown in FIG. 7A or 7B. A characteristic view shown in FIG. 7A indicates the following expressions:

When $0 < d_{fwz} \leq d_{fwz1}$ ($d_{fwz1}$ is 40 m as an example), $$P_{ofst} = -(P_{ofst1}/d_{fwz1}) \cdot d_{fwz} + P_{ofst1} \tag{2}$$

When $d_{fwz} > d_{fwz1}$, $$P_{ofst} = 0 \tag{3}$$

where $d_{fwz}$ represents the distance difference in the front-rear direction between the preceding vehicle and the forward gazing point distance, that is, $d_{fwz} = x_z - W_z$. Herein, the target position offset ratio $P_{ofst}$ represents the offset ratio at which almost the center of the traveling lane at the forward gazing point distance $W_z$ (that is, the first target position on the first vehicle traveling path based on the traveling-lane information (forward gazing point): the coordinate point ($l_{tgtx}, W_z$) in FIG. 5) shifts for correction toward the second vehicle traveling path at the forward gazing point distance $W_z$. For example, $P_{ofst1}$ is 0.9. This means that, even when the distance difference $d_{fwz}$ in the front-rear direction between the preceding vehicle and the forward gazing point distance is close to 0, the first target position is not completely shifted toward the second vehicle traveling path. The constants $P_{ofst1}$ and $d_{fwz1}$ have an influence on the feeling of the driver, and are tuned and set according to data obtained by experiment or by other methods. A characteristic view shown in FIG. 7B for setting the target position offset ratio $P_{ofst}$ is preset by a curve.

In S112, the amount of correction by which the forward gazing point is actually shifted toward the second vehicle traveling path passing through the forward gazing point distance $W_z$, that is, a target position offset amount $O_x$ is calculated from the above-described target position offset ratio $P_{ofst}$ set in S111 according to the following Expression (4):

$$O_x = P_{ofst}(K_x - l_{tgtx}) \tag{4}$$

where $K_x$ represents the X coordinate of the intersection of the second vehicle traveling path and the forward gazing point distance $W_z$, and is calculated by, for example, the following Expression (5) or (6):

When the preceding vehicle is running on the forward left side ($K_x < 0$), $$K_x = R_f + ((R_f + W_z) \cdot (R_f - W_z))^{1/2} \tag{5}$$

When the preceding vehicle is running on the forward right side ($K_x \geq 0$), $$K_x = R_f - ((R_f + W_z) \cdot (R_f - W_z))^{1/2} \tag{6}$$

Next, in S113, the forward gazing point is corrected on the basis of the target position offset amount $O_x$ calculated in S112, and a third target position $P_t(x_t,z_t)$ is set as follows:

$$P_t=(x_t,z_t)=(l_{tgtx}+O_x,W_z) \quad (7)$$

When it is determined in S102 that the traveling lane has not been detected, it is determined in S114 whether a preceding vehicle has been detected. When it is determined that the preceding vehicle has been detected, that is, that the traveling lane has not been detected, but the preceding vehicle has been detected, in S115, the vehicle speed $V_0$ is compared with the threshold value $V_1$ (for example, 35 km/h) of the vehicle speed. When the vehicle speed $V_0$ is less than the threshold value $V_1$ ($V_0 < V_1$), in S116, the coordinates of the center of gravity of the preceding vehicle, that is, $(x_f,z_f)$ is set as a target position $P_t(x_t,z_t)$, and the program proceeds to S118.

When the preceding vehicle has not been detected in S114, that is, none of the traveling lane and the preceding vehicle are detected, or when it is determined in S115 that the vehicle speed $V_0$ is more than or equal to the threshold value $V_1$, the current steering angle is maintained in S117, and the program is escaped.

After the target position $P_t(x_t,z_t)$ is set in any of S109, S113, and S116 described above, a target traveling radius $R_t$ is calculated in S118 according to the following expression (8):

$$R_t=(x_t^2+z_t^2)/(2 \cdot x_t) \quad (8)$$

Subsequently, it is determined in S119 whether a control-region setting flag F is 0. The control-region setting flag F is set at 0 when the previous control was performed in a high-speed section of a vehicle speed region to be controlled ($0 \leq V_0 < V_1$: for example, a region less than 35 km/h), and set at 1 when the previous control was performed in a low-speed section of the vehicle speed region. This flag is used to variably set the region with hysteresis between the low-speed section and the high-speed section, as will be described below.

When it is determined in S119 that the control-region setting flag F is set at 0, that is, that the previous control was performed in the high-speed region, it is determined in S120 whether the vehicle speed $V_0$ is higher than $V_2$ (for example, 20 km/h). It is determined in S120 that the vehicle speed $V_0$ is higher than $V_2$, the program proceeds to S121 so as to perform control in the high-speed region again, and a target yaw rate $\gamma_t$ is calculated according to the following expression (9):

$$\gamma_t=V_0/R_t \quad (9)$$

After the target yaw rate $\gamma_t$ is calculated in S121, in S122, a power-steering instruction current value $i_c$ is calculated from the target yaw rate γt according to the following Expression (10), and is then output:

$$i_c=G_{SR} \cdot (\gamma_t-\gamma_r)+G_{VR} \cdot (d(\gamma_t-\gamma_r)/d_t)+G_{HR} \cdot \int(\gamma_t-\gamma_r)d_t \quad (10)$$

where $G_{SR}$ represents the proportional gain, $G_{VR}$ represents the differential gain, and $G_{HR}$ represents the integral gain. Then, the control-region setting flag F is set at 0 in S123, and the program is escaped.

When it is determined in S120 that the vehicle speed $V_0$ is less than or equal to $V_2$, S125 is performed to shift to control in the low-speed region, and a target steering angle $S_t$ is calculated according to the following Expression (11):

$$S_t=(Lw \cdot Ns)/R_t \quad (11)$$

where Lw represents the wheel base, and Ns represents the steering gear ratio.

After the target steering angle $S_t$ is calculated in S125, in S126, a power-steering instruction current value $i_c$ is calculated from the target steering angle $S_t$ according to the following Expression (12), and is output:

$$i_c=G_{SS} \cdot (S_t-S_r)+G_{VS} \cdot (d(S_t-S_r)/d_t)+G_{HS} \cdot \int(S_t-S_r)d_t \quad (12)$$

where $S_r$ represents the actual steering angle ($=\theta_H/Ns$), $G_{SS}$ represents the proportional gain, $G_{VS}$ represents the differential gain, and $G_{HS}$ represents the integral gain. Then, the control-region setting flag F is set at 1 in S127, and the program is escaped.

In contrast, when the control-region setting flag F is set at 1 in S119, that is, the previous control was performed in the low-speed region, it is determined in S124 whether the vehicle speed $V_0$ is lower than $V_3$ (for example, 15 km/h). When it is determined that the vehicle speed $V_0$ is lower than $V_3$, S125 is performed to perform control in the low-speed region again, and a target steering angle $S_t$ is calculated according to Expression (11) described above.

Next, in S126, a power-steering instruction current value $i_c$ is calculated from the target steering angle $S_t$ according to Expression (12) described above, and is then output. In S127, the control-region setting flag F is set at 1, and the program is escaped.

When it is determined in S124 that the vehicle speed $V_0$ is higher than or equal to $V_3$, S121 is performed to shift to control in the high-speed region, and a target yaw rate $\gamma_t$ is calculated according to Expression (9) described above.

Next, in S122, a power-steering instruction current value $i_c$ is calculated from the target yaw rate $\gamma_t$ according to Expression (10) described above, and is output. Then, the control-region setting flag F is set at 0 in S123, and the program is escaped.

In this embodiment, automatic steering control is performed in a region where the vehicle speed $V_0$ is less than $V_1$ in this way. In a high-speed section of the vehicle speed region, a target yaw rate $\gamma_t$ of the vehicle 1 is calculated in accordance with the current position of the preceding vehicle and the current position of the vehicle 1, and a power-steering instruction current value $i_c$ for following the preceding vehicle is calculated from the target yaw rate $\gamma_t$ and is output to the electrical power-steering control device 13. In contrast, in a low-speed section of the vehicle speed region, a target steering angle $S_t$ of the vehicle 1 is calculated in accordance with the current position of the preceding vehicle and the current position of the vehicle 1, and a power-steering instruction current value $i_c$ for following the preceding vehicle is calculated from the target steering angle $S_t$ is output to the electrical power-steering control device 13. For this reason, it is possible to accurately obtain a traveling locus to be followed even in the low-speed running region. This allows accurate follow-up control.

As described above, according to the embodiment, in automatic steering control, particularly when both a traveling lane and a preceding vehicle have been detected, a target position on the first vehicle traveling path based on information about the traveling lane is set as a first target position, and a target position on the second vehicle traveling path based on information about the preceding vehicle is set as a second target position. When the second target position is set farther than the first target position, the amount of correction of the distance from the first target position to the second vehicle traveling path is set in accordance with the distance difference in the front-rear direction between the second target position and the first target position, and correction is made by the set correction amount so as to bring the first target position closer to the second vehicle traveling path, thus setting a third target position. The steering control amount is calculated from the third target position. For this reason, it is possible to perform natural control with proper consideration for the relationship between the traveling lane and the preceding vehicle in the traveling environment, and to stably perform steering assist control without giving any discomfort and anxiety to the driver.

A power-steering instruction current value $i_c$ set in the electrical power-steering control device 13 can be limited by a specified current value (for example, a value corresponding to the maximum control steering torque: 5 Nm) so that excessive steering force will not be added. Further, while the forward gazing point is set at almost the center of the traveling lane at the forward gazing point distance $W_z$ in this embodiment, it may be set at a point at a predetermined distance from the right or left end of the traveling lane. Also, constant-speed running control and acceleration and deceleration control for automatic follow-up control are not limited to those adopted in the embodiment. Further, while the preceding vehicle is recognized on the basis of images from the stereo camera, it can be recognized by other techniques, for example, on the basis of information from a millimeter-wave radar and a monocular camera.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle drive assist system comprising:
   traveling-lane information detecting unit configured to detect information about a forward traveling lane;
   preceding-vehicle information detecting unit configured to detect information about a preceding vehicle;
   first-target-position setting unit configured to set a target position on a first vehicle traveling path based on the information about the forward traveling lane as a first target position;
   second-target-position setting unit configured to set a target position on a second vehicle traveling path based on the information about the preceding vehicle as a second target position;
   third-target-position setting unit configured to set a correction amount in accordance with a distance difference in a front-rear direction between the second target position and the first target position when the second target position is set farther than the first target position, and configured to set a third target position by performing correction by the correction amount so that the first target position becomes closer to the second vehicle traveling path; and
   steering-control-amount calculation unit configured to calculate a steering control amount on the basis of the third target position.

2. The vehicle drive assist system according to claim 1, wherein the third-target-position setting unit sets the second target position as the third target position when the second target position is set closer than the first target position.

3. The vehicle drive assist system according to claim 1, wherein the third-target-position setting unit sets the correction amount so that the correction amount decreases as the distance difference in the front-rear direction between the second target position and the first target position increases.

4. The vehicle drive assist system according to claim 2, wherein the third-target-position setting unit sets the correction amount so that the correction amount decreases as the distance difference in the front-rear direction between the second target position and the first target position increases.

5. A vehicle drive assist system comprising:
   traveling-lane information detecting means for detecting information about a forward traveling lane;
   preceding-vehicle information detecting means for detecting information about a preceding vehicle;
   first-target-position setting means for setting a target position on a first vehicle traveling path based on the information about the forward traveling lane as a first target position;
   second-target-position setting means for setting a target position on a second vehicle traveling path based on the information about the preceding vehicle as a second target position;
   third-target-position setting means for setting a correction amount in accordance with a distance difference in a front-rear direction between the second target position and the first target position when the second target position is set farther than the first target position, and for setting a third target position by performing correction by the correction amount so that the first target position becomes closer to the second vehicle traveling path; and
   steering-control-amount calculation means for calculating a steering control amount on the basis of the third target position.

* * * * *